United States Patent [19]

Vasishth et al.

[11] 4,089,828

[45] May 16, 1978

[54] STABLE AQUEOUS EMULSIONS, PREPARATION AND USES THEREOF

[75] Inventors: Ramesh C. Vasishth, Delta; Pitchaiya Chandramouli, Richmond, both of Canada

[73] Assignee: Flecto Coatings Ltd., Richmond, Canada

[21] Appl. No.: 653,484

[22] Filed: Jan. 29, 1976

[30] Foreign Application Priority Data

Feb. 18, 1975 United Kingdom ............... 6809/75

[51] Int. Cl.$^2$ ............................................. C08L 33/04
[52] U.S. Cl. ..................... 260/29.6 TA; 260/42.21; 427/380; 526/318
[58] Field of Search ................... 260/29.6 TA, 42.21; 526/318

[56] References Cited

U.S. PATENT DOCUMENTS

| 2,939,855 | 6/1960 | Bartl et al. | 526/318 |
| 3,366,590 | 1/1968 | Taft | 526/318 |
| 3,991,007 | 11/1976 | Perronin et al. | 260/42.21 |

Primary Examiner—M. J. Welsh
Attorney, Agent, or Firm—Sim & McBurney

[57] ABSTRACT

Stable aqueous emulsions are described which are free from conventional emulsifiers and protective colloids and contains as the dispersed phase uniformly-sized particles of a copolymer of at least 75% by weight of acrylate monomer(s) or a mixture of acrylate monomer(s) and a vinyl monomer, optionally together with up to 10% by weight of the acrylate monomer(s) or the mixture, of a copolymerizable monomer having at least one functional group or reactive site, and up to 25% by weight of a monoester of an unsaturated dicarboxylic acid. The emulsions are formed by copolymerizing the monomers in an aqueous medium which is free from conventional additives including buffers, emulsifiers, stabilizing colloids and chain terminating compounds. The emulsions are particularly useful in formulating water-based air-drying high gloss paints.

26 Claims, No Drawings

STABLE AQUEOUS EMULSIONS, PREPARATION AND USES THEREOF

FIELD OF THE INVENTION

This invention relates to stable aqueous emulsions, preparation and uses thereof.

BACKGROUND TO THE INVENTION

Aqueous dispersions of polymeric materials (or emulsions having a dispersed phase of polymeric particles) produced by conventional emulsion polymerization techniques contain substantial quantities of protective colloids and surfactants. Conventional surfactants or emulsifiers and protective colloids are highly water sensitive, giving rise to water sensitivity in products formed from the emulsions, as discussed in more detail below, and hence are generally undesirable.

In various applications of latex polymers, the uniformity of particle size and average particle size play important roles. In order to produce emulsions of uniform particle size, using conventional emulsion polymerization procedures, it is necessary to resort to rather expensive and unconventional initiatiors.

In high gloss pigmented finishes, it is highly desirable that very small particle sized emulsions be used. In conventional emulsion polymerization, the actual size of the particle is generally controlled by the surfactant concentration. Thus, smaller particle sizes are obtained with higher surfactant concentrations and vice versa. However, higher concentrations of surfactant in an emulsion tend to render films formed therefrom highly water sensitive. Consequently, the much desired property of obtaining a fine particle sized emulsion that finds suitable application in high gloss water-based coating system has been obtained only with difficulty.

When such small particle sized emulsions are produced, not only is it necessary to employ large quantities of surfactants, but also it is necessary to introduce certain water-soluble colloids to stabilize the particles and prevent intraparticle coalescence. When such conventionally produced latex polymers are used in clear or pigmented air drying type finishes, the resulting coatings tend to be highly water sensitive. The reason for such water sensitivity stems from the high water solubility of the surfactant molecules and the water imbibing capacity of the protective colloids.

Conventional emulsion polymers are produced by free radical polymerization. When free radical polymerization is conducted with conventional water-soluble initiators, the pH of the reaction medium drifts toward acidic pH conditions. Acidic pH conditions are not favourable for emulsion polymerization since they lead to inefficiency, instability and coagulation. Consequently, it is conventional practice to use a series of buffering agents, such as phosphates and borates, to maintain the pH of the reaction medium at near neutral or slightly basic values. Buffering agents used are usually water soluble and their addition increases the water sensitivity of the films formed from emulsions containing them.

An additional drawback of conventional latex polymers is the constant drift in the pH of the emulsion, which again requires the addition of a buffering agent to achieve storage stability.

Free radial emulsion polymerization procedures result in high molecular weight polymeric products. The molecular weight of such polymers is normally in the range of 500,000 to a few million whereas the molecular weight of free-radially produced solution type polymers run in the 100,000 to 300,000 range. Tensile strength, impact strength, hardness, load bearing capacity, film forming and other mechanical properties are influenced by the polymer glass transition temperature and molecular weight. The mechanical properties of solution polymers are affected by the molecular weight. In addition, the polymer molecular weight influences the rheological properties of solution polymers. The solution polymers produced in the molecular weight range of 100,000 to 300,000 are good film formers and show adequate strength characteristics. Additionally, the solution polymers exhibit excellent rheological properties due to their relatively low molecular weight.

The latex polymers, due to the inherent nature of free radical polymerization, yield polymers of high molecular weight and hence exhibit superior mechanical strength characteristics. Unlike the solution polymers, the rheological properties of the polymers in the form of a latex are, generally, independent of the molecular weight. They are instead influenced by the latex particle size, particle size distribution, the number of particles and the type and concentration of emulsifier and protective colloids used in preparing the emulsion. As a result, the conventional latex polymers have poorer rheological properties than those of solution polymers.

In spite of the ease of emulsion polymerization, it is sometimes difficult to control the polymerization process, and hence the stability of the product, due to the rapid growth of the high molecular weight polymer particles. Consequently, to control the molecular weight of the latex polymers and hence the stability of the resultant latex particles, certain chain terminating agents and/or modifying agents, such as mercaptans and alcohols are used. It is highly undesirable to use such ingredients as the mercaptans and alcohols enhance the water sensitivity of the resultant polymer while both the alcohols and chlorinated solvents are pollution and health hazards.

One of the major application areas for latex polymers is in air drying clear and pigmented finishes of medium (70% on a 60° angle gloss meter) and low (30% on a 60° angle gloss meter) gloss. However, most latex polymers are unsuitable for producing high gloss pigmented finishes even at relatively low pigment levels. Additionally coatings made from these latex polymers exhibit very poor levelling. Organic solvent based finishes (enamel paints) such as the alkyds, urethanes, uralkyds and epoxies are capable of providing high gloss finishes which measure in the 90's on a 60° angle gloss meter, and have excellent levelling and other application characteristics. However, since the organic solvents used in these coatings are often inflammable and toxic there is a definite need for suitable water based coatings capable of giving high gloss air drying finishes with acceptable application characteristics. It may be added that with some latex polymers high gloss values are attainable but only at very low pigment levels. The hiding power of the coatings at such pigment levels is unacceptably low.

In addition to the initial low gloss values of no more than about 70% on a 60° angle gloss meter, finishes based on latex polymers tend to have very poor gloss retention, particularly in exterior use. This is perhaps due to the combination of large quantities of emulsifiers, surfactants, water-sensitive thickeners, colloids, pigment dispersion aids and other water-sensitive ingredients that are used in formulating the coating compositions.

As described earlier, latex polymers are sluggish in their flow behaviour, resulting in very poor levelling of the coating compositions. The flow properties of the coating are effected not only by those of the polymer particles themselves but also by those of other components of the composition such as water soluble thickeners. Latex polymer based pigmented or clear finishes need to be thickened to impart adequate film build and to impart thixotropy to prevent sagging. To achieve this thickening, it is normal practice to use cellulosic thickeners, which are readily available. Most cellulosic thickeners have acceptable flow characteristics only in limited applications. The use of cellulosic thickeners reduces the exterior durability of the finish as these thickeners, which are highly water-sensitive, tend to disintegrate under moisture and ultra-violet radiation. Some of them also undergo considerable yellowing on exterior exposure.

Consequently, a variety of synthetic polymeric thickeners has been developed that are suitable for exterior application. These polymeric thickeners, such as polyacrylates, although relatively high ultra-violet and water-resistant, do not have any better flow characteristics than the cellulosic thickeners. In addition, the thickening efficiency of such synthetic polymeric thickeners is much less than that of cellulosic thickeners, requiring the use of relatively large quantities. Consequently, when finishes containing such synthetic polymeric thickeners are used in exterior applications, the durability problem associated with cellulosic thickeners is largely overcome but the flow characteristics remain unsatisfactory.

In addition to the above drawbacks, conventional latex-based finishes have poor resistance to dirt pick-up, solvents, scrubbing and blocking and are softer than organic solvent-based enamels. Further, the water-based finishes have very poor resistance to fungal and microbiological attack.

It is common practice to produce finishes in a variety of colours and of varying intensities such as pastel shades, mid-tones and deep tone colours. With organic solvent-based finishes, it is possible to produce a range of colours without any detrimental effects on the gloss and gloss retention. However, with latex polymers insurmountable difficulties are encountered. For example, when tinting agents are added to a latex-based paint, generally the gloss drops drastically. This drop in gloss is mainly due to the incorporation of large quantities of pigment dispersants and tint acceptance aids. Such ingredients, in addition to affecting the gloss, reduce the mechanical strength and water-resistance of the finish.

With increasingly stringent regulations on the use of solvent-based finishes, industry is attempting to use, economically, water-based finishes in industrial applications. However, water-based finishes have considerable drawbacks and have yet to find wide spread use. One major problem is the production cycles. Water sensitive ingredients in latex polymers and the high molecular weight nature of the polymer result in the imbibing of large quantities of water which are retained for prolonged periods of time. Consequently when such latex polymers are used in industrial finishes, if an adequate drying or evaporation time is not provided prior to curing, the finishes tend to blister due to explosive evaporation of water and other volatile ingredients when high temperatures are encountered. Blistering can be avoided only by considerably prolonging the drying cycles, thus resulting in poor production efficiencies. To circumvent the latter problem, the industry has considered other water-based systems such as the water reducible and water thinnable alkyds, polyesters and the like. However, with such polymers, in addition to water, relatively large quantities of polar solvents, such as alcohols and amines need to be used, considerably increasing the cost of the process due to the necessity to recycle the solvents. In addition to these problems, latex-based finishes, when used in industrial application, suffer from other disadvantages such as lack of gloss, flow and hardness.

In electrodeposition using water-based systems, major surfactant and pigment migration problems are encountered resulting in non-uniform colours and inferior quality products. This necessitates constant monitoring and replenishment of the electrodeposition bath.

In view of the above prior art difficulties, in recent years considerable effort has been focussed on synthesizing aqueous dispersions of polymeric materials by processes involving only minor quantities of protective colloids and/or surfactants. However such procedures have not been successful in producing an emulsion having good overall properties.

Attempts have been made to incorporate specific molecules into the polymer to impart thereto a certain amount of surfactant properties. In this regard, stable aqueous dispersions of copolymers of ethylene with vinyl and acrylic monomers have been formed in the absence of conventional protective colloids and emulsifiers and in the presence of a copolymerizable half ester of maleic acid or maleic anhydride, the latter half ester providing the surfactant properties.

The latter procedure, however, uses very high pressure, thus requiring sophisticated equipment, and uses a predominance of ethylene in the copolymer to provide a variety of properties thereto. Additionally, the procedure requires the presence of substantial quantities of toxic solvents, such as tertiary butanol, to achieve solution of the water-insoluble reactants. The presence of such solvents, however, is known to affect the polymerization procedure drastically, resulting in high molecular weight products of large particle size.

In common with the conventional procedures described above, this prior art procedure also requires the presence of buffers in the aqueous medium to control pH during the polymerization reaction at near neutral or slightly alkaline pH. Further, this prior art procedure is only capable of producing dispersions having a low solids content from about 15 to 25% and it is necessary to concentrate the dispersion if a higher solids content is required, as is usually the case.

An alternative suggestion for making water based dispersions with low protective colloid and surfactant concentrations involves the formation of aqueous ammonical and/or alkaline dispersions of high molecular weight acrylic and/or vinyl polymers. The process for the manufacture of these products is very tedious and involves a multistep operation. Consequently these polymers are very expensive. Moreover, these dispersions contain large quantities of toxic alcohols and amines and are relatively low in polymer content (30 to 35%). Such dispersions have been in the market place for some time. However, their high cost coupled with their limited application potential restricting their use to only certain types of industrial finishes resulted in very little market penetration for such products.

SUMMARY OF THE INVENTION

It has been surprisingly and accidentally found that stable aqueous emulsions of certain polymers can be provided which do not suffer from the drawbacks of the prior art as outlined above. In accordance with the present invention there is provided a reactive stable aqueous emulsion having a dispersed phase of a copolymer of an acrylate monomer and a monoester of an alkanol and an ethylenically-unsaturated dicarboxylic acid, the copolymer having a substantially uniform particle size of from about 10 to 3000 Angstroms, and an aqueous phase of pH about 5.5 to 9 and substantially free from protective colloids and conventional emulsifiers.

The stable aqueous emulsion of the invention may be formed by copolymerizing the monomers at atmospheric pressure and at a temperature below about 100° C in an aqueous medium from which protective colloids, conventional emulsifiers, conventional buffers and chain terminating compounds are absent and from which organic solvents also are preferably absent, to form emulsions containing up to 50% solids.

GENERAL DESCRIPTION OF INVENTION

In this application, the term "stable" with respect to the emulsions of the invention, means that the polymeric particles remain dispersed in the continuous aqueous phase for an indefinite period without exhibiting the presence of any coagulum or sedimented solid particles.

In the present invention, the term "conventional emulsifiers" is meant to include all low molecular weight substances which are not capable of further polymerization but which, due to their structural features, are capable of forming "micelles" in aqueous solutions and which assist otherwise water-soluble material in forming either stable solutions or dispersions. Such molecules are generally characterized by a hydrophobic chain such as a long chain hydrocarbon moiety of up to about 30 carbon atoms and a highly hydrophilic group such as the sulfate, sulfonate or sulfo succinate group, some of the carboxylates and ammonium salts. The term "protective colloid" is meant to include polymer or simple molecules which help in maintaining otherwise insoluble or unstable molecules in discrete particles usually by forming a sheath around the molecules in a dispersion. In addition, the protective colloids are generally readily soluble in the continuous medium, forming a viscous solution. Typical protective colloids are starch, modified cellulosics such as hydroxy ethyl cellulose and carboxymethyl cellulose, and poly vinyl alcohol.

The acrylate monomer used in the formation of the emulsion in this invention has a general formula:

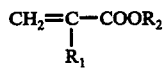

where $R_1$ is —H or —$CH_3$ and $R_2$ is a straight or branched chain saturated aliphatic or cyclo aliphatic group containing up to about 8 carbon atoms. A mixture of such acrylates may be used.

A mixture of acrylate monomer(s) and one or more vinyl monomer(s) may be used, the acrylate monomer(s) constituting at least 75% by weight of the mixture, and the vinyl monomer having the formula:

$$CH_2 = CH - R_3$$

where $R_3$ is an aryl group or $R_4COO$— where $R_4$ is a straight or branched chain saturated aliphatic or cyclo aliphatic group containing up to 8 carbon atoms.

The preferred acrylate monomers of the above general formula are methyl acrylate, ethyl acrylate, butyl acrylate, 2-ethyl hexyl acrylate, methyl methacrylate, ethyl methacrylate and butyl methacrylate.

The acrylate monomers usually are used as a mixture of esters of acrylic acid and esters of methacrylic acid, such as, a mixture of ethyl acrylate, butyl acrylate and methyl methacrylate.

The ratio of the esters of acrylic acid to those of methacrylic acid used to form the emulsion may be varied depending on the required end use of the product. Thus, depending on the glass transition temperature (Tg) required and depending on the hardness or softness requirement of the film, in the case of film-forming compositions, or on the properties of the copolymer in the case of non film-forming compositions, the relative proportions of the different esters of acrylic acid and esters of methacrylic acid may be varied widely.

Examples of vinyl esters which may be copolymerized with the acrylate monomers include styrene, substituted styrenes and vinyl alkyl esters, such as vinyl formate, vinyl acetate, vinyl propionate and vinyl butyrate.

The monoester of an unsaturated dicarboxylic acid which is copolymerized with the acrylate monomer(s) to provide the dispersed phase of the stable emulsion of the invention is one having the general formula:

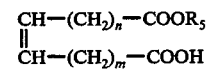

where $R_5$ is a straight or branched chain aliphatic or cyclo aliphatic group of at least 3 carbon atoms, $n$ and $m$ are each 0 or 1 and $n + m$ is 0 or 1.

The typical examples of the dicarboxylic acid moiety of the monoester are maleic acid, fumaric acid, itaconic acid and citraconic acid, preferably maleic acid. When the monoesters are formed, they may be produced from the anhydride of the dicarboxylic acid, if desired.

The alcohol moiety of the mono or the half ester of the dicarboxylic acid may be at least one straight or branched chain, saturated aliphatic or cyclo aliphatic monohydric alcohol or amino alcohol having at least 3 carbon atoms.

Examples of suitable aliphatic, cyclo aliphatic and amino alcohols include N-propanol and iso-propanol, and n-, iso- or tert-butanol, pentanol, hexanol, heptanol, octanol, decanol, dodecanol, 2-ethyl hexanol, dimethyl decanol, tetra decanol, cetyl alcohol, decalol and myristyl alcohol, and cyclo hexanol, cyclo hexyl methanol, trimethyl cyclo hexanol, borneol, isoborneol, menthol, amino methyl propanol, t-butyl amino ethanol, dibutyl amino ethanol and octyl amino ethanol. Of these alcohols the preferred alcohols are those having from about 6 to about 16 carbon atoms.

A particularly preferred monoester is monodecyl maleate.

In addition to the acrylate monomers, small copolymerized quantities of at least one monomer containing at least one functional group or reactive site may be present in the copolymer particles to improve various features of the emulsion, depending on the desired end use. Typical of such functional groups are carboxyl, hydroxyl, amino and epoxy groups and typical of the reactive site is ethylenic unsaturation.

Examples of such reactive and functional monomers include hydroxy propyl acrylate, hydroxy butyl acrylate, hydroxy ethyl acrylate, hydroxy ethyl methacrylate, hydroxy propyl methacrylate, acrylic acid, methacrylic acid, acrylamide, acrylonitrile, amino acrylates, amino methacrylates, cyanocrylates, glycidyl methacrylate, diacetone acrylamide, hydroxy methyl diacetone acrylamide, and dimethacrylates.

The quantity of such reactive or functional monomer may be as low as about 1% by weight of the acrylate monomer(s) and may vary up to about 10% by weight.

The total quantity of monomers comprised in the acrylate monomer(s), vinyl monomer(s), if present, and reactive and functional monomer(s), if present, is at least about 75% by weight of the polymer particles, with the remainder of the polymer particles being copolymerized monoester.

It is preferred that the acrylic and/or methacrylic ester monomers form about 90 to about 97% by weight of the polymer, with the quantity of monoester being between about 3 and 10%, preferably about 5% by weight of the polymer.

The polymeric particles which constitute the dispersed phase of the emulsions of this invention have a substantially uniform particle size in the range of about 10 to 3000 Angstroms. This is in contrast to the prior art emulsions which generally have a very broad distribution of particle sizes. The average size of particles in such prior art emulsions is also relatively large, usually in the 0.1 to 5$\mu$ range.

In addition, in contrast to prior art techniques, the particle size is controlled largely by a suitable choice of comonomers and the type and concentrations of reactive or functional comonomers. As described earlier in prior art techniques the particle size is generally controlled by the concentration of the surfactant and varies inversely with the concentration of the surfactant in the practical range of utility for such emulsions. In the procedure of the present invention this is not the case. The particle size of the emulsions made according to the procedure of this invention is substantially unaffected in the practical range of concentrations of up to 5% by weight of the surfactant monomer based upon total monomers added. Again, contrary to expectation, at concentrations above about 10% the particle size of the emulsions increases, the particle size distribution still remaining substantially uniform.

Yet another unexpected property of the emulsions of this invention is the relatively low molecular weights obtained without the use of chain terminating compounds. The molecular weights obtained range from 300,000 to 400,000 compared to 500,000 to about 2 million obtained with emulsions of conventional procedures where chain terminating compounds are used.

The aqueous continuous phase of the emulsion of this invention has a pH of about 5.5 to 9, preferably about 6 to 7, and is substantially devoid of conventional emulsifiers and protective colloids. The monoester component copolymerized into the dispersed phase particles provides the only emulsifier required to maintain the polymeric particles dispersed in stable manner in the water.

Since the only emulsifier required is incorporated into the solid dispersed phase of the emulsion in the present invention, the water sensitivity problems associated with conventional emulsifiers and protective colloids are avoided.

The emulsions of the invention exhibit no tendency to drifting of pH during storage and while the emulsions show an increase in particle size on storage, the original configuration of the particles in the aged emulsion of the invention may be restored under shear.

The emulsions of the invention have excellent flow and in this respect possess rheological properties that more often resemble those of solution acrylics and/or vinyls, in contrast to the poor flow characteristics of prior art latex polymers, as described above.

The emulsions of the present invention are produced by copolymerizing in an aqueous medium the acrylate monomer(s), optionally together with vinyl monomer(s) and/or reactive or functional monomer(s), and the monoester. The reaction is carried out at atmospheric pressure and at a temperature below about 100° C.

The aqueous medium is water to which substantially no conventional emulsifiers, protective colloids, or chain terminating agents are added. During the polymerization reaction the pH is self controlling and no additional buffering agents are required.

The reaction is also self-controlling with respect to the molecular weight and particle size of the finished polymeric particles in the emulsion formed, in complete contrast to the prior art, so that the disadvantages associated with the addition of chain terminating agents and emulsifiers are avoided.

The polymerization of the monoester into the polymer particles results in the imparting of surfactant properties to the polymer itself, so that a stable emulsion is produced without the necessity for conventional surfactants and protective colloids, thereby avoiding the prior art problems associated therewith.

Since the incorporation of the functionally reactive monoester provides the necessary surfactant properties required to stabilize the emulsion particle it is necessary that this monomer be uniformly incorporated into the polymer structure.

The monoesters are preferably employed in the form of their salts to enhance their solubility in the aqueous medium, especially in the form of their alkali metal or ammonium salts, with the sodium, potassium and ammonium salts being most preferred.

In a typical manner of producing the emulsion of this invention, part or all of the monoester, as a neutralized salt, is dissolved in water initially, and the remainder of the monoester is fed gradually either by itself or as an admixture with the acrylate monomers during the polymerization reaction.

When monomers that are highly soluble in water are used it is necessary to regulate the concentration of the water soluble monomers in the reaction medium, particularly the reactive monoester, throughout the polymerization reaction. This prevents copolymerization between the water soluble monomers themselves and gives a more uniform polymer structure. In practice this is achieved by controlling the solubility of the monoester in the initial charge by pH adjustment.

Organic solvents with their associated detrimental effects are unnecessary in the process of producing the emulsion of the invention. For example, they are not required to achieve the solubility of the reactants required for reaction and essential in the aforementioned ethylene copolymerization process. The present invention also does not require the very high pressures required in the ethylene copolymerization process.

The emulsion polymerization used to form the emulsions in this invention is effected in the presence of water-soluble substances capable of forming free radicals. Examples are potassium, sodium, ammonium and sodium-ammonium persulfates and hydrogen peroxide and various percarbonates. The aforementioned water-soluble peroxy compounds may be used as redox systems, that is, in combination with reducing agents. Examples of suitable reagents for such reducing agent combinations include sodium pyrosulfite or bisulfite, sodium formaldehyde sulphoxylate, triethanol amine, ferrous sulfate, ceric ammonium sulfate, ceric ammonium nitrate and hydrogen peroxide.

The polymerization is preferably carried out below about 80° C due to loss of catalyst efficiency and production of more homopolymers at higher temperatures. It is also conventional when a redox couple is used for catalysis, for the reaction temperatures usually to be substantially lower, typically about 40° to about 60° C, and such temperatures preferably are used in the present invention.

The emulsions of the invention may be produced by the above procedure in a variety of solid levels up to about 50% by weight. Typical solids levels are in the range of 15 to 50%, preferably 25 to 50% by weight, with the process being controlled most preferably to provide a solids level in the range of 35 to 50% by weight, since solids levels in this range are most efficient.

The rheology of the emulsions of this invention cover a wide spectrum of rheological properties depending on a number of factors, and may be changed by varying the proportion of surfactant comonomer and/or the proportion of the reactive or functional monomers in the monomer mixture. For example, when the pH of the emulsion is adjusted with an alkali, ammonia, and/or amino compounds, the emulsion formed from a monomer mixture including a hydroxy group-containing monomer as the functional monomer tends to give a thixotropic effect, while an emulsion formed from a monomer mixture including a carboxy group-containing monomer as the functional monomer gives a dilatent mass. Under the same pH conditions, an emulsion formed from a monomer mixture containing methyl methacrylate and ethyl acrylate has very little effect and behaves like a Newtonian fluid.

The emulsions of the present invention may be used for a variety of purposes for which latex polymers conventionally are used but without the drawbacks attendant the prior art latex polymers. For example, the emulsions of the invention may be used in textile finishing, paper sizing, the formation of industrial finishes, the formation of clear films and the formulation of air-drying paints.

Latex polymers are widely used in the formulation of water-based paints but the resultant products suffer from a number of drawbacks as enumerated above.

It has been found that the emulsions of the invention formed from certain monomer mixtures may be used to provide paints capable of producing pigmented coatings of high initial gloss in excess of 80% when measured on a 60° C angle gloss meter, good gloss retention, good exterior durability to the effects of both water and ultraviolet light and having good chalk resistance.

The emulsions used to provide such paints are formed from monomers including up to 10% by weight of a monomer containing a hydroxyl functional group, based on the weight of the acrylate monomer(s) or mixture of acrylate monomer(s) and vinyl monomer(s).

A particularly preferred monomer mixture contains methyl methacrylate, ethyl acrylate, butyl acrylate and hydroxyethyl methacrylate.

The emulsion of the invention is formulated with conventional pigments, pigment dispersants, freeze-thaw inhibiting solvents, such as glycols, thickeners and defoamers to provide the paint composition. Coalescing solvents also may be present, if desired, although typically in less concentration than are conventionally used.

The paint may be formulated to provide any desired viscosity, but values in the range of 75 to 100 Krebb units are preferred.

The high initial gloss value attainable with the paints of the invention and the high gloss retention and the good exterior durability characteristics exhibited by the pigmented coatings are in contrast to the properties of conventional latex paints which are described in detail above.

The fine particle size nature of the polymer particles imparts improved hiding power in a given coating as compared to that which can be obtained with conventional latex paints, so that less pigment is required to obtain an equivalent hiding. The small particle size and the relatively low molecular weight of polymer particles also lead to excellent levelling and flow behaviour in contrast to the prior art, and show no evidence of lap marks and brush or application dry marks in the pigmented coating.

The pigmented coatings formed from the paints of the invention exhibit good hardness, flexibility and blocking resistance. The pigmented coatings have very low dirt pick up and good soil resistance, excellent solvent resistance and excellent scrubbing resistance. Such properties are not exhibited by pigmented coatings formed from conventional latex paints, as described in more detail above.

The pigmented coatings also have good resistance to fungal and microbial attack without the necessity of added anti-fungal and anti-microbial agents in contrast to the prior art, where such agents are essential.

Considerably less quantity of thickeners is required with the latex emulsion of the invention to produce the same viscosity of paint as compared with the prior art latex polymers, so that the water sensitivity problems associated with the presence of such thickeners are diminished.

The paint provided from the emulsions of the invention exhibit stability following five freeze-thaw cycles and have low odor.

The emulsions of the invention also may be used to provide baked enamel finishes without the attendant prolonged cycling time of the prior art, since the finishes of the invention dry rapidly to provide high gloss finishes and in the absence of both external cross linking promoting resins, such as methoxy melamines and urea type resins and acid catalysts.

Additionally, it is anticipated the surfactant migration and pigment migration problems of prior art electrodeposition and baked enamel procedures do not occur when the emulsions of the present invention are used for these purposes.

The emulsions of the invention may also be used to provide clear finishes, adhesives, in textile and paper sizing and in other application areas where conventional latex polymers are currently being used.

EXAMPLES

This invention is illustrated by the following Examples:

EXAMPLE I

This Example illustrates the formation of an emulsion in accordance with the present invention.

To a suitable reaction vessel equipped with means of temperature control, agitation and a vapour condenser was added an aqueous solution of 635 parts of water and 21 parts of monodecyl maleate neutralized with 5.2 parts of potassium hydroxide solution to a pH of 7.0 ± 0.1.

An initiator solution of 1.2 parts of ammonium persulfate and 20 parts of water was divided into two parts with an initial charge to the aqueous solution consisting of 10.6 parts of the solution and a delayed feed consisting of the other 10.6 parts of the initiator solution.

The aqueous solution was heated to about 72° ± 2° C and a delayed monomer feed of 234 parts of methyl methacrylate and 366 parts of ethyl acrylate (MMA:EA::39:61) to the aqueous solution was commenced at a rate of 5 ml/minute.

The delayed initiator solution addition was commenced and added over the same period as the delayed monomer feed. Further, a neutralized (pH 7) solution of 100 parts of water and 9 parts of monodecyl maleate and 2.5 parts of KOH was slowly added to the aqueous solution commencing 15 minutes after commencement of addition of the delayed monomer feed and delayed initiator feed and this addition was completed about 15 minutes before addition of the acrylate monomers was completed.

During addition of the delayed reactants, the temperature of the reaction medium rose to about 80° C and the reaction mixture was maintained at that temperature for a further 60 minutes, before being cooled to about 25° C and filtered.

The total maleate concentration was 5% based on the acrylates and the ratio of aqueous to delayed feed was 7:3.

The resulting emulsion of a solids content of 45.45% exhibited a bluish hue, had a dispersed phase of small uniformly sized particles, showed very little coagulum and was substantially free from any dissolved gritty particles.

A film cast from the emulsion on a glass surface showed excellent water resistance and showed no signs of blistering after exposure to water in a water spot test.

EXAMPLE II

This Example illustrates the formation of additional emulsions according to this invention using an alternative acrylate monomer.

The procedure of Example I was repeated except that the soft monomer ethyl acrylate was replaced with 2-ethyl hexyl acrylate. The concentration of monodecyl maleate was 12 percent based on the acrylic monomers and was used in a 38 : 62 aqueous/delayed feed weight ratio. The weight ratio of methyl methacrylate to 2-ethyl hexyl acrylate was changed in individual runs and the properties of the resultant emulsions are reproduced in the following Table I:

Table I

| | Ratio MMA/2EHA* | | Emulsion Solids (%) | Properties of film cast from Emulsion. |
|---|---|---|---|---|
| Run 1 | 60 | 40 | 39.4 | Very brittle clear film |
| Run 2 | 40 | 60 | 43.7 | Very soft elastic film |
| Run 3 | 52 | 48 | 45.4 | Clear soft film |

*MMA is methyl methacrylate and 2EHA is 2-ethyl hexyl acrylate.

EXAMPLE III

This Example illustrates the formation of other emulsions according to this invention having hydroxy functionality in the polymer particles.

The procedure of Example I was again repeated except that the acrylic monomer combinations included a functional reaction monomer containing hydroxy functionality in addition to the methyl methacrylate and ethyl acrylate. The monodecyl maleate concentration in this Example was 4 percent by weight based on the total acrylic monomers and exclusive of the maleate itself. The maleate was split in a weight ratio of 3:7 and used as aqueous and delayed charges respectively at a pH of 7.0 ± 0.1 by neutralization with potassium hydroxide solution. Differing monomers containing hydroxy functionality were used and the results obtained are shown in the following Table II:

Table II

| Hydroxy Monomer | Acrylic Combination Ratio | | | Emulsion Solids % | Particle Size μ |
|---|---|---|---|---|---|
| | MMA*/ | EA*/ | Hydroxy Monomer | | |
| none | 39 | 61 | — | 40 | 0.07 |
| Hydroxy Propyl Acrylate | 37 | 58 | 5 | 40 | 0.06 |
| Hydroxy Ethyl Methacrylate | 37 | 58 | 5 | 40 | 0.06 |
| Hydroxy Propyl Methacrylate | 37 | 58 | 5 | 40 | 0.07 |

*MMA is methyl methacrylate and EA is ethyl acrylate.

EXAMPLE IV

This Example illustrates the formation of further emulsions according to the present invention containing hydroxy functionality.

Four charges were prepared, namely, aqueous reaction medium, delayed monomer feed, delayed surfactant feed and initiator feed.

The monomer mixture used was a mixture of methyl methacrylate, ethyl acrylate, butyl acrylate and hydroxyethyl methacrylate in the weight proportion of 43:50:2:5. The surfactant monomer was monodecyl maleate and the initiator was ammonium persulfate.

The aqueous reaction medium charge of 7 parts of monodecyl maleate and 24.5 parts of water neutralized with 2.54 mls of 50% KOH was fed to a reaction vessel and heated to about 70° C. To the heated medium was added 6.5 parts of a solution of 0.5 parts of $(NH_4)_2S_2O_8$ in 12.5 mls of water resulting in a small increase in temperature.

Delayed monomer feed consisting of 107.5 parts of methyl methacrylate, 125 parts of ethyl acrylate, 5 parts of butyl acrylate and 12.5 parts of hydroxy ethyl methacrylate was gradually added to the reaction mixture along with the remaining 6.5 parts of the initiator solution. The delayed monomer feed and the initiator feed were added at a uniform flow rate over a period of about 2 hours over which period of time the pH of the reaction medium remained substantially constant and the temperature rose to about 80° C.

About 50 minutes after commencement of addition of the delayed monomer feed and the initiator feed, a delayed surfactant monomer feed containing 3 parts of monodecyl maleate, 30 parts of water and 1.05 mls of a 50% KOH solution was added to the reaction mixture over a period of about 1 hour.

When the reactant addition had been completed, the reaction mixture was maintained at about 80° C for a further period of one hour to ensure complete conversion of monomer into latex, followed by cooling.

The resultant slightly bluish emulsion was filtered to ensure freedom from coagulum and less than 0.1% coagulum was observed.

The viscosity of the emulsion was found to be 1580 cps using #3 spindle at 60 rpm (Brookfield Viscometer). The emulsion had a 45% solids concentration, with the particles having an average size below 0.1μ and an average molecular weight below 500,000.

The emulsion provided an air-dried film of gloss value 83% on a 60° Gardner Gloss Meter and good gloss retention. The emulsion exhibited excellent flow properties in the formation of the air-dried film.

Samples of the emulsion produced by the above procedure were stored for a period of six months and examined at the end of this period. No sedimentation was observed at the end of the storage period although some particle coalescence had occurred. However, the storage period was found to have had no noticeable adverse effect on the properties of the emulsion.

EXAMPLE V

This Example illustrates the formation of emulsions containing acid functionality.

The procedure of Example IV was followed except that functional monomers of the acid type replaced the hydroxyethyl methacrylate. The effect of pH on the copolymerization of acid type functional monomers was observed and the results are reproduced in the following Table III.

tralization. The effect of the pH conditions on the copolymer properties are reproduced in the following Table IV:

Table IV

| pH of Reaction | Emulsion Solids % | Emulsion Particle Size μ | Emulsion pH | Remarks |
|---|---|---|---|---|
| 6.0 | 44.7 | 0.075 | 6.34 | Textured appearance of clear film |
| 7.0 | 44.5 | 0.071 | 6.72 | Smooth appearance |
| 9.3 | 44.5 | 0.075 | 6.85 | Textured appearance of clear film. |
| 12.0 | 44.4 | 0.091 | 6.85 | High degree of texturing apparent. |

EXAMPLE VII

This Example demonstrates the self buffering action of the emulsion polymerization process of this invention.

To the reaction vessel equipped with suitable means of agitation and temperature control was added 2786 parts of water, 56 parts of monodecyl maleate and 18.7 ml of a 50% potassium hydroxide solution and the pH of the contents was found to be 7.05 The contents of the vessel were heated to 72° ± 2° C when the system was initiated with 2 parts of ammonium persulfate dissolved in 50 parts of water. After attaining a temperature of 80° ± 2° C the delayed monomer and initiator feeds were commenced and added as described in Example IV. The delayed monoester feed of 24 parts of monodecyl maleate and 240 parts of water neutralized with 8.0 ml of 50% potassium hydroxide to a pH of 7.0 was also added to the reaction vessel in the usual way. The delayed monomer feed consisted of 740 parts of methyl methacrylate, 1160 parts of ethyl acrylate and 100 parts of hydroxy propyl acrylate. During the polymerization, Table III

| Acid Monomer Type | Acid Monomer % | pH of Reaction | Particle Size μ | Emulsion Solids % | pH of Emulsion | Remarks |
|---|---|---|---|---|---|---|
| Acrylic Acid | 5 | 7.0 | — | — | — | Flocculated just before completion of monomer feeds. |
| | 3 | 7.0 | — | — | — | Flocculated just after completion of monomer feeds. |
| | 2 | 6.5 | — | — | — | Considerable flocculation, whitish emulsion |
| | 3 | 5.0* | 0.195 | 43.5 | 5.80 | Whitish emulsion with some degree of flocculation |
| Methacrylic Acid | 5 | 7.0 | — | — | — | Flocculated during post polymerization after completion of monomer feeds. |
| | 3 | 7.0 | — | — | — | Considerable flocculation |
| | 2 | 7.0 | 0.086 | 44.3 | 5.85 | Whitish emulsion with some flocculation |
| | 5 | 5.5* | 0.193 | 43.9 | 5.83 | Whitish emulsion with some flocculation, better than 2%, 7.0 pH emulsion. |

*The delayed maleate was used as a half ester without neutralization with alkali and fed during the polymerization as part of the acrylic monomer feed.

EXAMPLE VI

This Example illustrates the effect of initial pH on the emulsion polymerization process of the invention.

The procedure of Example IV was repeated except that the pH values of the aqueous charge and the delayed monoester feeds were at three different levels of 6.0, 9.3 and 12.0. The pH of 9.3 corresponds to the total neutralization of the monoester, that of 12.0 is well over the neutralization point while a pH of 6.0 is under neusamples were withdrawn at 15 minute intervals and the pH measured. The pH values are shown in Table V below.

The experiment was repeated with the following monomer composition change and the pH measured as described earlier. 740 parts of methyl methacrylate, 1160 parts of ethyl acrylate and 100 parts of methacrylic acid were used in the delayed monomer feed. In this run the aqueous charge was neutralized with 15.0 ml of 50% potassium hydroxide solution to a pH of 6.0 and the delayed monoester was added to the delayed monomer feed without neutralization. The results are reproduced in the following Table V:

In each case, the polymerization reaction was carried out as described in Example IV and the results are reproduced in the following Table VI:

Table VI

| Maleate Concentration % | Ratio Aqueous Delayed Maleate | Emulsion Solids % | Emulsion pH | Emulsion Particle Size, μ | Emulsion Viscosity Cps | Remarks**** |
|---|---|---|---|---|---|---|
| 4 | 10:0 | 44.50 | 6.47 | ≃0.06*** | 690 | Emulsion gelled during irradiation for particle size analysis |
| 6 | 7:3 | 44.21 | 6.75 | 0.072 | 520 | |
| 8 | 7:3 | 43.61 | 6.75 | 0.066 | 100 | Emulsion was light orangy-blue in colour and exhibited the Tindall effect |
| 12 | 7:3 | 42.04 | 6.75 | 0.075 | 20 | Similar to emulsion with 8% maleate but the effect was less pronounced. |
| 15 | 7:3 | 42.47 | 6.72 | 0.116 & <0.03** | 20 | Emulsion with relatively larger particle size. The surfaces of both the clear and pigmented finishes exhibited a hazy, oily layer and the gloss of the films was very low (<20). |
| 20 | 7:3 | 36.87* | 6.60 | 0.5 & <0.03** | — | Emulsion flocculated |
| 20 | 1.4:8.6 | 36.75* | 6.73 | 0.415 & <0.03** | 180 | Whitish emulsion with some flocculation. Both clear and pigmented films showed a hazy, oily appearance and had very little gloss. |

*Low solids possibly due to retardation of polymerization in the presence of excessive quantities of maleate.
**Particle populations of two different sizes present. Particles within each size group are nearly uniform in size.
***Visual comparison with emulsions of similar particle size.
****Pigmented finishes were prepared according to the procedure of Example XII below.

Table V

| Run 1 | | Run 2 | |
|---|---|---|---|
| MMA/EA/HPA* time (min) | pH | MMA/EA/MAA* time (min) | pH |
| 0 | 7.00 | 0 | 6.00 |
| 15 | 7.00 | 15 | 6.15 |
| 30 | 7.05 | 20 | 5.80 |
| 45 | 6.95 | 30 | 5.20 |
| 60 | 6.95 | 45 | 5.20 |
| 90 | 6.90 | 60 | 5.30 |
| 135 | 6.80 | 120 | 5.45 |
| 170 | 6.65 | 135 | 5.50 |
| | | 165 | 5.75 |

*MMA is methyl methacrylate, EA is ethyl acrylate, HPA is hydroxy propyl acrylate and MAA is methacrylic acid.

It is evident from the results of the above Table V that the emulsion polymerization reaction is self buffering. The same self-buffering effect is observed with the emulsion polymerization reactions involving acidic functional monomers.

EXAMPLE VIII

In this example, the concentration and the mode of addition of the dicarboxylic acid monoester were varied and the resultant effect of the said change on the copolymer properties observed.

EXAMPLE IX

In this Example, the concentration of hydroxy ethyl methacrylate was changed and the effect of the concentration of this monomer on the resultant copolymer properties was observed.

The polymerization reaction was carried out as described in Example IV and the results are set forth in the following Table VII:

TABLE VII

| Hydroxy Monomer Concentration 1,2 | Reaction pH | Emulsion Solids % | Emulsion pH | Emulsion Particle Size μ | Emulsion Viscosity cps | Remarks[3] |
|---|---|---|---|---|---|---|
| None | 7.0 | 45.41 | 6.75 | ≃0.07* | 1230 | Pigmented and clear finishes showed poor (<50%). Paints showed poor flow properties and storage stability. |
| 1% | 7.0 | 44.45 | 6.74 | ≃0.07* | 5400 | As above |
| 3% | 7.0 | 45.43 | 6.71 | 0.075 | 5150 | As above. Gloss and flow better than early paints. |
| 5% | 7.0 | 44.81 | 6.74 | 0.071 | 1580 | Excellent gloss and gloss retention as well as flow with pigmented finishes. |
| 8% | 7.0 | 44.75 | 6.70 | 0.083 | 840 | Excellent gloss and gloss retention. Paints obtained are of low viscosity. |
| 10% | 7.0 | 44.62 | 6.50 | 0.095 | 140 | Excellent gloss and gloss retention. Paints obtained are of even lower viscosity |

*Emulsions gelled during irradiation for particle size determination. Values are relative and by visual comparison.
[1] Beyond 5% Hema concentration, the viscosity of both the emulsions and the pigmented finishes dropped as the Hema concentration increased.
[2] The tint acceptance characteristics improved considerably with increasing Hema concentration.
[3] Pigmented finishes were produced according to the procedure of Example XII below.

It is evident from the results of the above Table VII that hydroxy functional monomers, in concentrations greater than about 3%, impart advantageous effects to the properties of the emulsions.

EXAMPLE X

This Example illustrates the formation of emulsions using additional functional monomers.

The polymerization procedure of Example IV was followed except that dimethyl amino ethyl methacrylate, t-butyl amino ethyl methacrylate and glycidyl methacrylate were substituted for the hydroxy ethyl methacrylate.

In addition, this Example illustrates the formation of emulsions containing more than one functional monomer. Typically, one of the functional monomers is a hydroxy acrylate and the second functionality consists of either an amino acrylate or a glycidyl acrylate.

The reaction conditions and the properties of the emulsions so produced were observed and the results are reproduced in the following Table VIII:

Table VIII

| Functional Monomer(s) | Monomer Feed Composition MMA/EA/BA/F* | Reaction pH | Emulsion Solids % | Emulsion pH | Emulsion Particle Size, μ | Emulsion Viscosity Cps | Remarks** |
|---|---|---|---|---|---|---|---|
| Dimethyl amino ethyl methacrylate | 43:50:2:5 | 7.0 | 42.91 | 7.98 | — | 20 | Excessive flocculation. |
| Dimethyl amino ethyl methacrylate | 45:50:2:3 | 6.0 | 43.62 | 7.70 | ≃0.07[4] | 30 | Considerable flocculation. Emulsion gelled during irradiation for particle size analysis. |
| Dimethyl amino ethyl methacrylate | 43:50:2:5 | 9.0 | 43.54 | 8.43 | 0.082 | 60 | Low viscosity paint, excess flow |
| Dimethyl amino ethyl methacrylate | 45:50:2:3 | 9.0 | 43.81 | 8.35 | 0.058 | 150 | Low viscosity paint, excess flow |
| DMAEMA/-HEMA[1] | 40:50:2:3:5 | 9.0 | 44.01 | 7.99 | 0.098 | 110 | Low viscosity paint, excess flow. |
| t-BAEMA/-HEMA[2] | 40:50:2:3:5 | 9.0 | 44.31 | 8.83 | 0.101 | 160 | Low viscosity paint, excess flow. |
| Glycidyl methacrylate | 45:50:2:3 | 6.0 | 43.70 | 5.89 | ≃0.07[4] | 130 | Emulsion gelled during irradiation for particle size analysis. Paint with brush drag and high viscosity. |
| GMA/HEMA[3] | 41:50:2:2:5 | 6.0 | 44.11 | 5.96 | ≃0.07[4] | 74 | Emulsion gelled during irradiation for particle size analysis. Paint with brush drag and high viscosity. |

*MMA is methyl methacrylate, EA is ethyl acrylate, BA is butyl acrylate and F represents the functional monomer(s).
**All paints made according to the formulation outlined in Example XII below.
[1]DMAEMA and HEMA refer to dimethyl amino ethyl methacrylate and hydroxy ethyl methacrylate respectively
[2]t-BAEMA and HEMA refer to t-butyl amino ethyl methacrylate and hydroxy ethyl methacrylate respectively.
[3]GMA and HEMA refer to glycidyl methacrylate and hydroxy ethyl methacrylate respectively.
[4]Values are by visual comparison with emulsions of similar particle size.

EXAMPLE XI

This Example illustrates the incorporation of acrylamide, N-methylol acrylamide, diacetone acrylamide or hydroxy methyl diacetone acrylamide into the copolymer disperse phase of this invention.

To a suitable reaction flask equipped with means of agitation and temperature control were added 14 parts of monodecyl maleate, 380 parts of water and 3.1 parts of potassium hydroxide to give an aqueous charge of pH 7 ± 0.1.

The delayed maleate feed consisted of 6 parts of monodecyl maleate, 61 parts of water and 1.4 parts of potassium hydroxide to give a pH of 7 ± 0.1 and to give a total maleate concentration of 6.0 percent based on other monomers exclusive of maleate.

The monomer feed consisted of 133 parts of methyl methacrylate, 209 parts of ethyl acrylate and 18 parts of the amide functional monomer to give a monomer composition of weight ratio 37:58:5 respectively.

The polymerization reaction was carried out following the procedure outline in Example IV and the properties of the resultant copolymers are reproduced in the following Table IX:

Table IX

| Functional Monomer | Emulsion Solids % | Remarks |
|---|---|---|
| Acrylamide | 45.4 | Fine particle sized emulsion, clear film was hard, had orange peel surface |
| Diacetone Acrylamide | 45.6 | Fine particle sized emulsion, clear film was very soft. |
| Hydroxy Methyl Diacetone acrylamide | 45.2 | Fine particle sized emulsion, clear film was very soft |
| N-Methylol acrylamide | 45.0 | Fine particle sized emulsion, clear film was hard and had orange peel surface. |

EXAMPLE XII

This Example illustrates a paint formulation based on the emulsion provided by the procedure of Example IV. All parts are by weight.

10 parts of water, 7.25 parts of Nuosperse HOH, 70 parts of ethylene glycol, 4 parts of Balab Defoamer 3036-29A, 4 parts of Tween 80 and 1 part of 28% NH₄OH were premixed and dispersed at high speed in 300 parts of RHD6X TiO₂.

With slow agitation there was added 56 parts of water, 730 parts of the emulsion produced as described in Example IV adjusted to pH 9 to 9.5, and a premix of 23 parts of thickener LN (15%), 40 parts of ethylene glycol and 40 parts of water.

The resultant paint composition flowed readily onto a substrate surface with good hiding and dried rapidly to provide a glossy white painted surface.

Paint surfaces also were provided from a number of commercially available water-based latex paints, a water-based acrylic latex formulated from a commercial emulsion and ingredients recommended by the manufacturer of the commercial emulsion, a water-based acrylic latex formulated from the commercial emulsion and the addition ingredients enumerated above to form the paint of the invention, and an organic solvent-based uralkyd and epoxy paints.

The properties of the latter painted surfaces were compared with the painted surface provided from the paint formulated in accordance with the invention and the results are reproduced in the following Table X:

TABLE X

| Property | This Invention | A | B | C | D | E | F | G | H | I | J |
|---|---|---|---|---|---|---|---|---|---|---|---|
| | | | | | | Commercial | | | | | |
| Physical & Application Characteristics | | | | | | | | | | | |
| Hiding Power [1,2] | | | | | | | | | | | |
| 180 lbs. (18 kg)TiO$_2$(14.4 Pvc) | Excellent | | | Fair | | | | | | | |
| 200 lbs. (20 kg)TiO$_2$(16.0 Pvc) | Excellent | | | Good | | | | | | | |
| 250 lbs. (25 kg)TiO$_2$(20.0 Pvc) | Excellent | | | Excellent | | | | | | | |
| Coverage sq.ft./Imp.gallon (sq.m/l) | 600 (12.24) | | | 500 (10.22) | | | 500(10.22) | | 500 (10.22) | | |
| Brushability | Very good | good[5] | good[7] | good[5] | excellent | fair[5] | good[5] | fair[5] | fair[7] | excellent | |
| Rollability | Very good | fair-good[7] | fair-good[7] | fair-good[7] | good | poor[6] | poor[6] | poor;hu 6 | fair[7] | excellent | |
| Exterior Exposure | | | | | | | | | | | |
| (Gloss % on 60° angle meter) | | | | | | | | | | | |
| initial | 83 | 79 | 66 | 68 | 90 | — | 57 | — | 77 | 93 | 95 |
| 12 months | 77 | 64 | 52 | 65 | 74 | — | 40[3] | — | 70 | 75 | 80 |
| Accelerated Weathering | | | | | | | | | | | |
| (gloss retention, % based on original gloss) | | | | | | | | | | | |
| Scrub Resistance | 88 | — | 85 | 81 | — | — | — | — | 74 | — | — |
| gloss reading (% on 60° angle gloss meter) | | | | | | | | | | | |
| initial | 83 | 77 | 75 | 74 | 90 | 65 | 60 | 60 | 78 | 93 | 95 |
| after 500 cycles | 83 | 75 | 73 | 70 | 88 | 39 | 20 | 35 | 67 | 93 | 95 |
| after 1000 cycles | 79 | 68 | 70[4] | 69[4] | 85 | 30 | 15 | 23 | 64 | 90 | 93 |
| Stain Removal | | | | | | | | | | | |
| Mustard | removed | | | | | | | | | | |
| Shoe Polish | removed | | | | | | | | | | |
| Lead Pencil | removed | | | | | | | | | | |
| Crayon | removed | | | | | | | | | | |
| Lipstick | removed | | | | | | | | | | |
| Resistance to Chemicals | | | | | | | | | | | |
| Acetic Acid | good | slight blister | good | good | | good | | slight blister | good | excellent | |
| Isopropanol | soft | soft | soft | soft | | soft | | soft | soft | " | |
| Concentrated Ammonia | good | good | good | good | | good | | good | good | " | |
| Mineral Spirits | good | good | good | good | | good | | slight blister | slight blister | good | excellent |
| Sward Hardness | 26 | — | — | 24 | | 18-20 | | — | 26 | 28-30 | |
| Soil Resistance | excellent | poor | poor | fair | poor | poor | poor | poor | poor | excellent | |
| Water Spotting | " | excellent | excellent | excellent | excellent | excellent | excellent | excellent | excellent | " | |
| Shower Resistance | " | good | good | good | good | good | good | good | good | very good | |
| Flexibility | " | excellent | excellent | excellent | excellent | excellent | excellent | excellent | excellent | excellent | |
| Blocking Resistance | very good | fair-good | fair-good | fair-good | fair-good | fair-good | fair-good | fair-good | fair-good | | |

Foot Notes

Commercial  A Vinyl-acrylic emulsion
B & C All acrylic emulsions
D Water dispersed alkyd resin
E-H Commercial gloss latex paints
I Solvent based uralkyd enamel
J Solvent based epoxy enamel.

All tests were conducted according to the specifications outlined in ASTM paint testing manual (special technical publication 500)
[1]Paints for all hiding power experiments were made according to the general procedure of example XII, but of three different TiO$_2$ levels, keeping the total volume solids constant (or 31.0%).
[2]The TiO$_2$ levels refer to 100 Imperial gallons (100 liters) of paint.
[3]6 months exposure
[4]Many striations from scrub brush.
[5]Brush marks
[6]Highly textured
[7]Textured The results of the above Table X quite clearly demonstrate the superiority of a paint formulated from an emulsion made according to this invention in a large number of properties as compared with commercial water based paints and paints formulated from water-based emulsions.

The results of the above Table X also demonstrate that the water-based latex paints formulated from the emulsions of the invention approach the initial gloss properties of solvent-based uralkyd and epoxy paints and have superior gloss retention properties to the uralkyd and epoxy paints.

EXAMPLE XIII

This Example illustrates the production of pastel shade, mid tone and deep tone coloured paints using the emulsion provided by Example IV.

The paints were prepared in a similar manner to the procedure of Example XII with ingredients as set forth in the following Table XI:

Table XI

|  | Pastel Base (parts) | Mid Tone Base (parts) | Deep Tone Base (parts) |
|---|---|---|---|
| Raw Materials: |  |  |  |
| Ethylene Glycol | 110 | 110 | 110 |
| Water | 50 | 100 | 160 |
| Nuosperse | 7 | 5 | 1 |
| Tween | 5 | 4 | 1 |
| Defoamer | 6 | 6 | 5 |
| TiO$_2$ (RHD6X) | 180 | 100 | 30 |
| Emulsion (45% solids) | 730 | 730 | 730 |
| Thickener LN | 18 | 22 | 35 |
| Total | 1106 | 1107 | 1072 |
| Tinter (Phthalo Blue) parts/liter | 44 | 58 | 92 |

The paints formulated as set forth in the above Table XI were tested for their properties and compared with paints based on a commercially available, all-acrylic emulsion and solvent based uralkyd type enamels. The results are reproduced in the following Table XII:

Table XII

|  | Paints made with the emulsions of this invention. | | | Paints made with Commercial all acrylic emulsions. | | | Commercial Solvent Based Enamels. | | |
|---|---|---|---|---|---|---|---|---|---|
|  | Pastel | Mid Tone | Deep Tone | Pastel | Mid Tone | Deep Tone | Pastel | Mid Tone | Deep Tone |
| Gloss Percent (Measured on a 60° gloss meter) | 80 | 78 | 77 | 77 | 70 | 65 | 93 | 93 | 93 |
| Hiding Power | Excellent | Excellent | Good | Excellent | Excellent | Good | Excellent | Excellent | Excellent |
| Tint Acceptance | Very Good | Fair-Good | Very Good | Poor | Good | Good | Excellent | Excellent | Excellent |
| Brushability | Good | Good | Fair-Good | Fair-Good | Fair-Good | Fair-Good | Excellent | Excellent | Excellent |
| Rollability | Good | Good | Fair-Good | Good | Fair | Poor-Fair | Excellent | Excellent | Excellent |
| Appearance | Better flow than a Commercial Acrylic emulsion based paint. | | | Inferior in flow compared to a Commercial Acrylic based white emulsion paint. Tinters lower the gloss of the paint. | | | Excellent | Excellent | Excellent |

It is evident from the above Table XI, that the emulsions of this invention are superior in their performance, when used to produce coloured paints and compare favourably in their performance to solvent based paints.

EXAMPLE XIV

This example illustrates an industrial paint formulation of the baking enamel type based on the emulsions provided by the procedure of Examples IV, VIII, IX and X. All parts are by weight.

100 parts of water, 9.25 parts of Tamol 731 (25%), 4.00 parts of Tween 80 and 1.00 parts of Defoamer 618 were premixed and dispersed at high speed in 250 parts of rutile titanium dioxide (RHD6X) and 3.0 parts of Defoamer 618.

With slow agitation there were added 730 parts of the appropriate emulsion ($\simeq$45% non volatile solids) adjusted to a pH of 9 to 9.5 with 5.0 parts of ammonia (28% concentration), 8.0 parts of Thickener LN (15% non volatile solids) and 122 parts of water.

The resultant paints which had a low viscosity of about 58 Krebb units were suitable for dip coat applications.

Three types of substrates were choosen for paint application. These are as follows:

1. Tin sheet sanded and primered with one coat of a "metal prep" type paint.
2. Anodized aluminum sheet sanded and treated with one coat of a factory primer and a second coat of a metal prep type primer and
3. Anodized aluminum sheet sanded and primered with one coat of metal prep type primer.

The various emulsions tested for their suitability in baked enamels are listed in Table XIII below. In addition, in this test a commercial all acrylic latex polymer and a water based acrylic collodial dispersion are included.

Table XIII

| No. | Emulsion Composition MMA:EA:BA:F*(Maleate % based on acrylic monomers) | Functional Monomer (s) | Type of Emulsion | Non Volatile Solids % |
|---|---|---|---|---|
| 1 | 43:50:2:5 (4%) | HEMA** | Example IV | 44.8 |
| 2 | 38:50:2:10 (4%) | HEMA** | Example IX | 44.6 |
| 3 | 43:50:2:5 (8%) | HEMA** | Example VIII | 43.6 |
| 4 | 45:50:2:3 (4%) | GMA** | Example X | 43.7 |
| 5 | 41:50:2:3:5 | GMA/ HEMA** | Example X | 44.1 |
| 6 | Commercial Acrylic Dispersion in Water/Alcohol | | | |
| 7 | Commercial Acrylic Latex | | | |
| 8 | Same as 1 except paint formulation of Example XII was used | | | |

*Meanings as in footnote in Table VIII
**HEMA is hydroxy ethyl methacrylate and GMA is glycidyl methacrylate.
good The tin plate based primered panels were coated (one brush coat) with the various paints based on emulsions outlined in Table XIII and allowed to air dry for 20 minutes. The panels were then transferred into a forced convection air type oven maintained at 350° ± 5° F. The panels were subsequently baked at this temperature for a period of 20 minutes, then withdrawn from the oven and allowed to cool.

The anodized aluminum based primered panels were also coated with the various paints and baked in a similar fashion except that both the air drying cycle and the oven baking cycle were reduced to 10 minutes.

All the baked panels were tested, after cooling, for their adhesion, appearance, blistering, etc. The results are reproduced in Table XIV:

Table XIV

| | Enamel No. 1 | | | | | | | | | | | |
|---|---|---|---|---|---|---|---|---|---|---|---|---|
| | 1 | | | 2 | | | 3 | | | 4 | | |
| | A | B | C | A | B | C | A | B | C | A | B | C |
| Appearance | VG | VG | VG | F | F | F | G | G | G | G | G | G |
| Adhesion | E | E | E | VG | VG | VG | E | E | E | E | E | E |
| Hardness | VG | VG | VG | G | G | G | VG | VG | VG | VG | VG | VG |
| Solvent Resistance | | | | | | | | | | | | |
| Xylene | VG | VG | VG | G | G | G | VG | VG | VG | VG | VG | VG |
| Carbitol (Diethylene glycol mono ethyl ether) | VG | VG | VG | G | G | G | VG | VG | VG | VG | VG | VG |
| Isopropanol | G | G | G | G | G | G | G | G | G | G | G | G |
| | 5 | | | 6 | | | 7 | | | 8 | | |
| | A | B | C | A | B | C | A | B | C | A | B | C |
| Appearance | G | G | G | E | G[2] | G[2] | F[3] | F[3] | F[3] | G | G | G |
| Adhesion | E | E | E | G | G | G | G | G | G | VG | VG | VG |
| Hardness | VG | VG | VG | G | G | G | FG | FG | FG | VG | VG | VG |
| Solvent Resistance | | | | | | | | | | | | |
| Xylene | VG | VG | VG | P | P | P | F | F | F | VG | VG | VG |
| Carbitol (Diethylene glycol mono ethyl ether) | VG | VG | VG | P | P | P | F | F | F | VG | VG | VG |
| Isopropanol | G | G | G | F[4] | F[4] | F[4] | F[4] | F[4] | F[4] | G | G | G |

Foot Notes
A Tin plate with one coat of metal prep type primer and one coat of enamel
B Anodized aluminum plate with one coat of metal prep type primer and one coat of enamel
C Anodized aluminum plate with one coat of factory primer, one coat of metal prep type primer and one coat of enamel
[1]For composition details refer to Table XIII
[2]Painted surfaces were very tacky after removal from oven.
[3]Presence of small blisters.
[4]Films softened and became very tacky.
G is good
VG is very good
FG is fairly good
F is fair
P is poor
E is excellent It is evident from the results described in Table XIV that the emulsions of this invention are capable of forming durable and hard baked enamel finishes in the absence of both external cross linking promoting resins such as methoxy melamines and urea type resins and acid catalysts.

SUMMARY

The present invention, therefore, provides a stable aqueous emulsion having superior properties, methods of production thereof and paints formulated from the emulsions. Modifications are possible within the scope of the invention.

What we claim is:

1. A stable aqueous emulsion having a solids loading of about 15 to 50% and consisting essentially of a continuous aqueous phase having a pH of about 5.5 to 9 and which is free from conventional emulsifiers and protective colloids and a dispersed phase which is a copolymer of
(A) at least 75% by weight of
(i) at least one acrylate monomer of the formula:

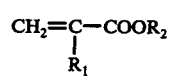

where $R_1$ is —H or —$CH_3$ and $R_2$ is a straight or branched chain saturated aliphatic or cycloaliphatic group containing up to 8 carbon atoms, and
(ii) up to about 10% by weight of said acrylate monomer(s) of a copolymerizable monomer having at least one functional group selected from carboxyl, hydroxyl, amino and epoxy and/or reactive site, which is ethylenic unsaturation other than that taking part in copolymerization with said acrylate monomer(s), and
(B) up to about 25% by weight of at least one monoester of an unsaturated dicarboxylic acid of the formula:

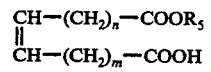

where $R_5$ is a straight or branched chain saturated aliphatic or cycloaliphatic group of at least 3 carbon atoms, $n$ and $m$ are each 0 or 1 and $n+m$ is 0 or 1,
said copolymer having a substantially uniform particle size in the range of about 10 to 3000 Angstroms.

2. The emulsion of claim 1, wherein said acrylate monomer is selected from methyl acrylate, ethyl acrylate, butyl acrylate, 2-ethyl hexyl acrylate, methyl methacrylate, ethyl methacrylate and butyl acrylate.

3. The emulsion of claim 1, wherein said acrylate monomer is a mixture of esters of acrylic acid and esters of methacrylic acid.

4. The emulsion of claim 3, wherein said mixture of monomers is a mixture of ethyl acrylate, butyl acrylate and methyl methacrylate.

5. The emulsion of claim 1, wherein said unsaturated dicarboxylic acid is selected from maleic acid, fumaric acid, itaconic acid and citraconic acid.

6. The emulsion of claim 1, wherein said unsaturated dicarboxylic acid is maleic acid.

7. The emulsion of claim 1 wherein $R_5$ is an alkyl group having 6 to 16 carbon atoms.

8. The emulsion of claim 1, wherein said copolymer contains about 3 to about 10% by weight of said monoester.

9. The emulsion of claim 8, wherein said copolymer contains about 5% by weight of said monoester.

10. The emulsion of claim 1, wherein said at least one functional group is a hydroxyl group.

11. The emulsion of claim 1, wherein said copolymerizable monomer is selected from the group consisting of hydroxy propyl acrylate, hydroxy butyl acrylate, hydroxy ethyl acrylate, hydroxy ethyl methacrylate, hydroxy propyl methacrylate, acrylic acid, methacrylic acid, acrylamide, acrylonitrile, amino acrylates, amino methacrylates, cyano acrylates, glycidyl methacrylate, diacetone acrylamide, hydroxy methyl diacetone acrylamide, and dimethacrylates.

12. The emulsion of claim 1, wherein the continuous aqueous phase has a pH of about 6 to 7.

13. A method of forming a stable aqueous emulsion, which comprises:
copolymerizing in water at substantially atmospheric pressure and at a temperature below about 100° C in the absence of conventional emulsifiers, protective colloids, buffers and dissolved chain terminating compounds, the monomers consisting of at least 75% by weight of
(A) (i) (a) at least one acrylate monomer of the formula:

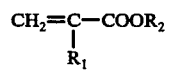

where $R_1$ is —H or —$CH_3$— and $R_2$ is a straight or branched chain saturated aliphatic or cycloaliphatic group containing up to 8 carbon atoms, or
(b) a mixture of at least about 75% by weight of said at least one acrylate monomer and up to about 25% by weight of at least one vinyl monomer of the formula:

where $R_3$ is aryl or $R_4COO$— where $R_4$ is a straight or branched chain saturated aliphatic or cycloaliphatic group containing up to 8 carbon atoms and
(ii) 0 to about 10% by weight of said acrylate monomer (a) or mixture (b) of a copolymerizable monomer having at least one functional group or reactive site, and
(B) up to about 25% by weight of at least one monoester of an unsaturated dicarboxylic acid of the formula:

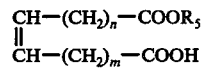

where $R_5$ is a straight or branched chain saturated aliphatic or cycloaliphatic group of at least 3 carbon atoms, $n$ and $m$ are each 0 or 1 and $n+m$ is 0 or 1, and
recovering from said copolymerization a stable aqueous emulsion of pH about 5.5 to 9 and having a dispersed phase consisting essentially of a copolymer of said monomers of substantially uniform particle size in the range of about 10 to 3000 Angstroms
part of said monoester being dissolved as a neutralized salt in the water and a free-radical polymerization initiator and said acrylate monomer or mixture together with the remainder of said monoester being gradually fed to the water.

14. The method of claim 13, wherein said salt is a sodium, potassium or ammonium salt.

15. The method of claim 13, wherein said polymerization is carried out at a temperature below about 80° C.

16. The method of claim 13, wherein the parameters are controlled to provide a solids loading in said emulsion of about 35 to about 45% by weight.

17. A water-based, air drying paint composition capable of providing a high gloss pigmented coating of gloss value in excess of 80% measured on a 60° angle gloss meter on a substrate surface, comprising conventional pigments, pigment dispersants, freeze-thaw inhibiting solvents, thickeners and defoamers, and, as the latex polymer, an aqueous emulsion having a solids loading of about 15 to 50% by weight, a continuous aqueous phase which is free from conventional emulsifiers and protective colloids and a dispersed phase which is a copolymer of
(A) at least 75% by weight of
(i) (a) at least one acrylate monomer of the formula:

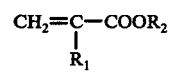

where $R_1$ is —H or —CH and $R_2$ is a straight or branched chain saturated aliphatic or cycloaliphatic group containing up to 8 carbon atoms or,
(b) a mixture of at least about 75% by weight of said at least one acrylate monomer and up to about 25% by weight of at least one vinyl monomer of the formula:

where $R_3$ is aryl or $R_4COO$— where $R_4$ is a straight or branched chain saturated aliphatic or cycloaliphatic group containing up to 8 carbon atoms and
(ii) up to about 10% by weight of said acrylate monomer(s) (a) or mixture (b) of a copolymerizable monomer having at least one hydroxy functional group, and
(B) up to about 25% by weight of at least one monoester of an unsaturated dicarboxylic acid of the formula:

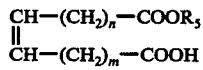

where $R_5$ is a straight or branched chain saturated aliphatic or cycloaliphatic group of at least 3 carbon atoms, $n$ and $m$ are each 0 or 1 and $n+m$ is 0 or 1, said copolymer having a substantially uniform particle size in the range of about 10 to 1000 Angstroms.

18. The composition of claim 17, wherein said copolymerizable monomer is hydroxyethyl methacrylate.

19. The composition of claim 17, wherein said acrylate monomer is a mixture of methyl methacrylate, ethyl acrylate and butyl acrylate.

20. The composition of claim 19, wherein said copolymerizable monomer is hydroxyethyl methacrylate.

21. The composition of claim 17, wherein said monoester is monodecyl maleate.

22. The composition of claim 20, wherein said monoester is monodecyl maleate.

23. The composition of claim 17 wherein said pigments impart a pastel shade to said coating.

24. The composition of claim 17, wherein said pigments impart a mid-tone shade to said coating.

25. The composition of claim 17 wherein said pigments impart a deep-tone shade to said coating.

26. The composition of claim 17 wherein said emulsion has a solids loading of about 35 to about 45% by weight.

* * * * *